United States Patent [19]

Murai et al.

[11] Patent Number: 5,063,398
[45] Date of Patent: Nov. 5, 1991

[54] COLOR IMAGE RECORDING APPARATUS

[75] Inventors: Hiroaki Murai, Chigasaki; Tatsuya Katano, Fujisawa; Shigeki Kikuchi, Hamakita, all of Japan

[73] Assignee: Matsushita Graphic Communication Systems, Inc., Tokyo, Japan

[21] Appl. No.: 665,127

[22] Filed: Mar. 6, 1991

[51] Int. Cl.⁵ ............................................. G03G 15/01
[52] U.S. Cl. ..................................... 346/157; 355/327
[58] Field of Search ................ 346/157; 355/212, 296, 355/326, 327

[56] References Cited

U.S. PATENT DOCUMENTS 4,569,584  2/1986  St. John et al. ................. 346/157 X

FOREIGN PATENT DOCUMENTS 63-149664  6/1988  Japan .

Primary Examiner—A. T. Grimley
Assistant Examiner—P. Stanzione
Attorney, Agent, or Firm—Lowe, Price, LeBlanc & Becker

[57] ABSTRACT

A color image recording apparatus records a composite color image composed of a plurality of superimposed images of different colors on a recording medium. Each latent image represented by an image signal is formed in a first image recording medium on the recording medium, and then another latent image is formed in a second image recording medium, following the first image recording area, of the recording medium. Then, the latent image in the first recording medium is developed into a visible image by a developing unit with a developing solution containing toner particles of one color. When the recording medium is fed along, toner particles in any residual developing solution left in the developing unit are attracted to the latent image in the second image recording area of the recording medium.

7 Claims, 7 Drawing Sheets

COLOR IMAGE RECORDING APPARATUS

BACKGROUND OF THE INVENTION

1. Field of the Invention

The present invention relates to the art of electrophotographic recording systems, and more particularly to a color image recording apparatus for successively forming electrostatic latent images on a recording medium with information provided by electronic signals, and successively developing the electrostatic latent images, with a plurality of respective color image developing units, into respective visible component color images, which are superimposed into a composite color image on the recording medium.

2. Description of Related Art

As color plotter systems and printers are developed in recent years, there is a demand for printed color images of as good quality as color photoprints.

Conventional color image recording systems include monochromatic electrophotographic image recording systems and multicolor electrophotographic image recording systems. In the monochromatic electrophotographic image recording systems, electrostatic latent images are developed into visible images immediately after the latent images are formed. In the multicolor electrophotographic image recording systems, since two or more latent images of different colors are formed and developed in superimposed relation on a recording medium, the recording medium is reciprocally moved a plurality of times while repeating the formation and development of the electrostatic latent images until a composite color image is produced.

One multicolor electrographic image recording apparatus is disclosed in U.S. Pat. No. 4,569,584 patented Feb. 11, 1986. The disclosed color image recording apparatus includes a recording station having a recording electrode means for forming a latent image on a recording medium, and a linear array of independent developing means adjacent to either one side or both sides of the recording station.

In operation, the recording medium is fed in one direction while a first component latent image is being formed on the latent image. Thereafter, the first component latent image is developed into a first component color image. Then, the transport of the recording medium is reversed, and a second component latent image is formed in superimposed relation to the first developed image, followed by its color development. The above process is repeated until all component latent images are formed and developed to form a desired composite color image.

Japanese Laid-Open Patent Publication No. 63(1988)-149664 published June 22, 1988 shows a similar multicolor image recording apparatus. The disclosed multicolor image recording apparatus also has a recording medium reciprocally movable a plurality of times to repeat the formation and development of a plurality of electrostatic latent images until a composite color image is produced. However, unlike the image recording apparatus disclosed in U.S. Pat. No. 4,569,584, a plurality of developing units are mounted on a rotor, and are selectively brought into a developing position by rotation of the rotor. The developing units on the rotor take a less space than the linear array of developing means, and the image recording apparatus may be smaller, than the image recording apparatus with the linear array of developing means. In addition, positional control of the developing units on the rotor is easier to perform.

When the recording medium is wound back, however, any developing solution left in a groove of the developing unit tends to be applied to the recording medium, resulting in smears in the plotted image area. Such smears are caused because though the developing units are spaced a certain distance from the recording medium as it is wound back, any residual developing solution is apt to be applied to the recording medium due to the surface tension of the residual developing solution in the developing units, and the recording medium rubs against the recording head.

Another problem with the rotary image developing system is that when the developing units are not in the developing position, any residual developing solution tends to flow or drop out of the developing units, causing contamination on surroundings with toner particles contained in the leaking developing solution.

SUMMARY OF THE INVENTION

It is an object of the present invention to provide a color image recording apparatus which can remove a residual developing solution from developing units, without use of any developing solution drawing unit, so that no smear will contaminate reproduced images.

Another object of the present invention is to provide a color image recording apparatus which includes a rotary image developing system, and has means for preventing any developing solution from flowing or dropping out of developing units, thus avoiding contamination on surroundings.

According to the present invention, a color image recording apparatus for recording a composite color image composed of a plurality of superimposed images of different colors on a recording medium, includes a recording head for first latent images on the recording medium as it is reciprocally moved in respective strokes, and a plurality of developing units for developing the first latent images formed on the recording medium into respective visible images with respective developers of different colors which are supplied respectively to the developing means, in the respective strokes. After the respective first latent images are formed in the respective strokes, the recording head forms second latent images each of a predetermined length on the recording medium.

The recording means may be arranged in a linear array along the path in which the recording medium is fed, or mounted on a rotor at spaced angular intervals. The first latent images are formed and developed in superimposed relation in a first image recording area of the recording medium, and the second latent images are formed in the second image recording area which immediately follows the first image recording area.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
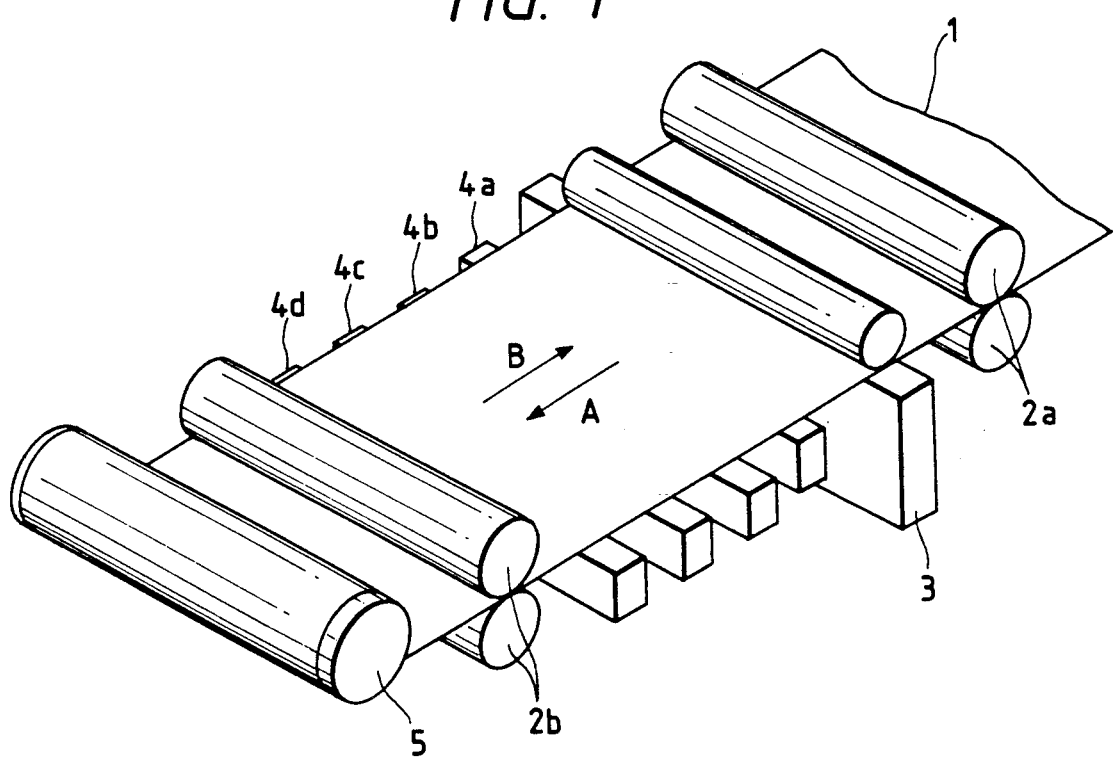
FIG. 1 is a schematic perspective view of a color image recording apparatus according to a first embodiment of the present invention.

FIG. 1 schematically shows a color image recording apparatus according to a first embodiment of the present invention. The color image recording apparatus has two pairs of feed rollers 2a, 2b for reciprocally feeding an elongate sheet 1 of electrostatically recording paper along a feed path in the directions indicated by the arrows A, B, an electro-statically recording head 3 disposed in a recording position beneath the sheet 1 for forming an electrostatic latent image on the sheet 1, an array of developing units 4a, 4b, 4c, 4d arranged along the path of the sheet 1 therebeneath and positioned between the pairs of feed rollers 2a, 2b, and a takeup roll 5 for winding the sheet 1 therearound. The sheet 1 is supplied from a supply roll (not shown). The developing units 4a through 4d are supplied with respective developing solutions which contain toner particles of black, cyan, magenta, and yellow.

A process of recording a color image on the sheet 1 will be described below. The operator manually pulls the sheet 1 from the supply roll, threads a leading portion of the sheet 1 through the feed rollers 2a, 2b, fixes the leading end of the sheet 1 to the takeup roll 5 with an adhesive tape or the like, and rotates the takeup roll 5 until a certain length of the sheet 1 is wound around the takeup roll 5. Then, one of the developing units, e.g., the developing unit 4a, is brought into a developing position, and the sheet 1 is fed in the direction indicated by the arrow A by the feed rollers 2a, 2b. While the sheet 1 is being thus fed, the recording head 3 is energized to form an electrostatic latent image on an image recording section or area of the sheet 1. Then, the electrostatic latent image is developed into a black image by the developing unit 4a. At this time, the takeup roll 5 is being rotated by an actuator such as a torque motor which can hold the sheet 1 under constant tension. Therefore, the sheet 1 is wound around the takeup roll 5 under constant tension.

After the black image has been recorded on the sheet 1, the developing unit 4a is moved out of the developing position, and then the rotation of the feed rollers 2a, 2b is reversed to feed the sheet 1 back in the direction indicated by the arrow B until the image recording section of the sheet 1 returns to an initial position. Then, the developing unit 4b is moved into the developing position, and a cyan image is recorded on the image recording section of the sheet 1 in superimposed relation to the previously recorded black image, in the same manner as described above. The black and cyan images are registered with each other under the control of a superimposition control unit (not shown). Other component color images, i.e., magenta and yellow images, are also recorded in superimposed relation to the black and cyan images. As a result, a composite color image which is composed of the black, cyan, magenta, and yellow images is recorded on the sheet 1. The image recording section of the sheet 1 is then wound on the takeup roll 5. After the composite color image has been recorded on the sheet 1, the sheet 1 is manually cut off by a cutter or the like between the feed rollers 2b and the takeup roll 5, and then the image recording section with the composite color image recorded thereon is removed from the takeup roll 5. The image recording process is now finished.

In order to prevent the sheet 1 from being smeared by any residual developing solution in the developing units 4a through 4d when the sheet 1 is fed back from the takeup roll 5, an electrostatic latent image of a predetermined length is formed on the sheet 1 by the recording head 3 after a component color image has been formed on the sheet 1. An arrangement for forming such an electrostatic latent image to prevent the sheet 1 from being smeared will now be described below with reference to FIGS. 2 through 4.

Figure 2:
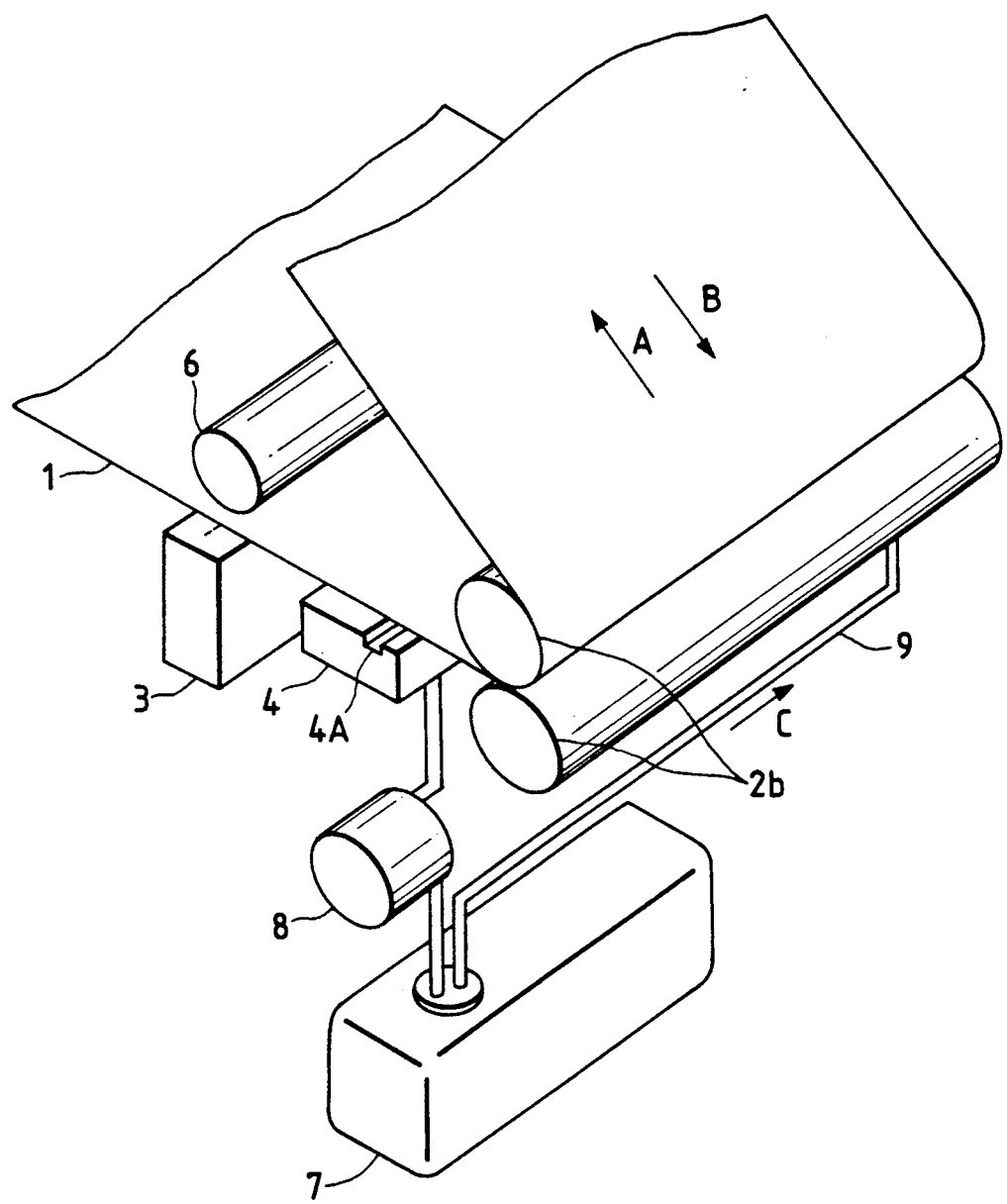
FIG. 2 is an enlarged perspective view showing in greater detail a portion of the color image recording apparatus according to the first embodiment.

FIG. 2 shows at enlarged scale the recording head 3, one of the developing units, denoted at 4, and the feed rollers 2b. The other developing units are omitted from illustration, and the sheet 1 is shown as being oriented upwardly beyond the feed rollers 2b. The sheet 1 is pressed against the recording head 3 by a pad roller 6 disposed above the sheet 1. The developing unit 4 is of a length extending across the sheet 1 and has a longitudinal open groove 4A defined in an upper surface of the developing unit 4. A developing solution of one of the colors, i.e., black, cyan, magenta, and yellow, is contained in a developing solution tank 7. The developing solution in the tank 7 is supplied to and discharged from the groove 4A of the developing unit 4 by a vacuum pump 8. The developing solution is supplied from the tank 7 to the groove 4A through a supply pipe 9. Those developing units which are omitted from illustration also have respective longitudinal grooves and are associated with respective tanks, pumps, and supply pipes.

In operation, the developing unit 4 is held against the sheet 1, and the vacuum pump 8 is actuated to develop a vacuum in the groove 41 and the supply pipe 9. The developing solution is drawn from the tank 7 and flows through the supply pipe 9 into the groove 4A in the direction indicated by the arrow C. Therefore, the developing solution circulates through the supply pipe 9, the groove 4A, the pump 8, and the tank 7. The feed rollers 2b (and also the feed rollers 2a) are rotated to feed the sheet 1 in the direction indicated by the arrow A. The recording head 3 now forms an electrostatic latent image on an image recording section or area a1 (see FIG. 4) of the sheet 1 which is pressed against the recording head 3 by the pad roller 6. As the image recording area of the sheet 1 where the electrostatic latent image is formed passes over and across the groove 4A in which the developing solution flows, toner particles contained in the developing solution are attracted to the latent image, developing the latent image into a visible component color image.

After having formed the electrostatic latent image on the image recording section or area of the sheet 1, the recording head 3 forms an electrostatic latent image, which is actually a solid image, in another image recording section or area b (see FIG. 4) of a predetermined length along the sheet 1 immediately following the electrostatic latent image in the image recording area a1. When the electrostatic latent image is fully developed by the developing unit 4, as described above, the supply pipe 9 interconnecting the tank 7 and the groove 4A is closed by a valve (not shown). Most of the developing solution in the groove 4A is discharged into the tank 7 by the vacuum pump 8 under atmospheric pressure. However, a slight amount of developing solution remains undischarged in the groove 4A. When the image recording area b moves over the groove 1, toner particles in the residual developing solution in the groove 4A are attracted to the electrostatic latent image formed in the image recording area b. The length of the image recording area b is selected so as to be large enough to attract most of the toner particles contained in the residual developing solution in the groove 4A. The length of the image recording area b may typically, but not necessarily, be 10 cm at most.

Figure 3:
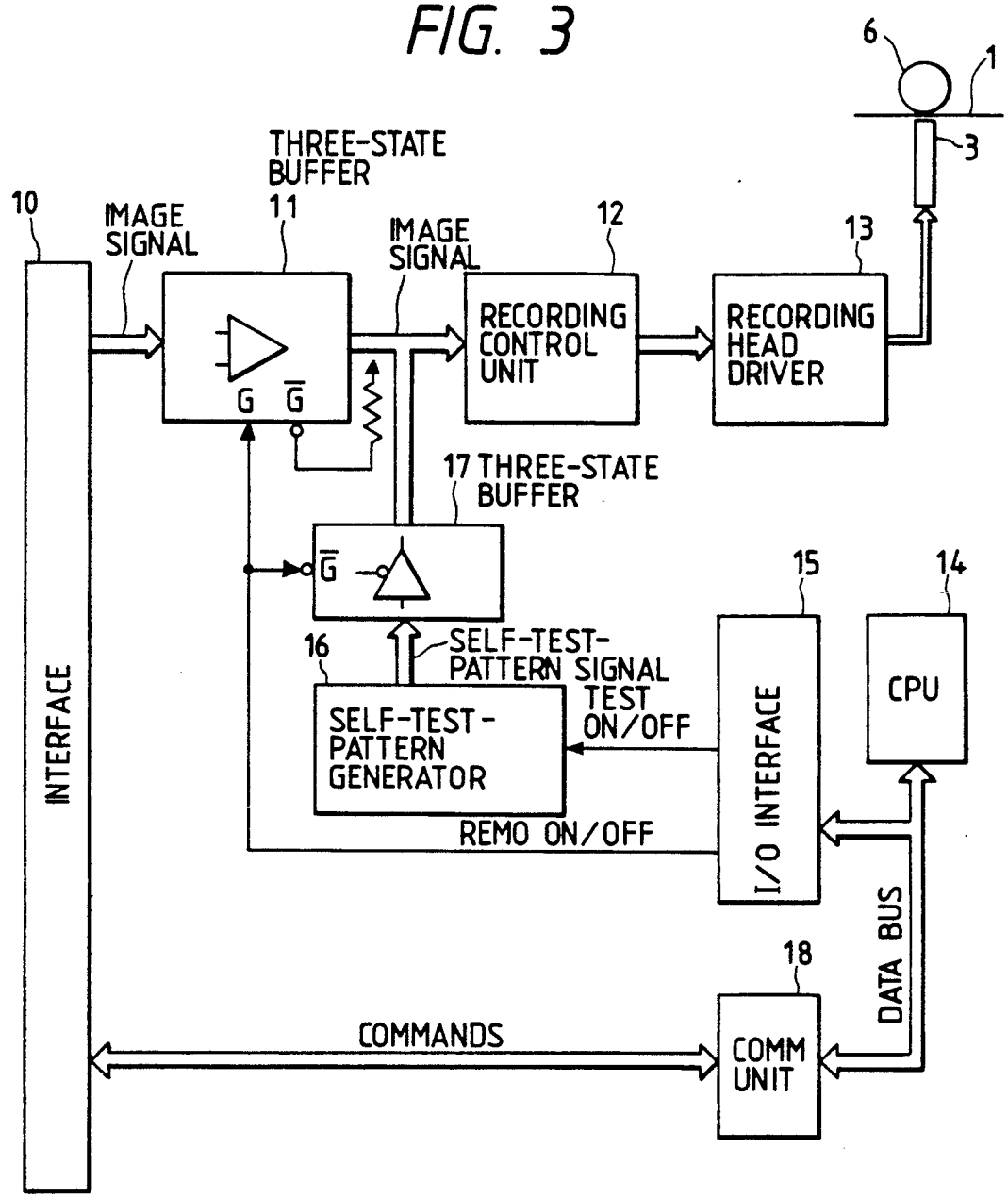
FIG. 3 is a block diagram of a control system for controlling the application of image signals to a recording head of the color image recording apparatus according to the first embodiment.

FIG. 3 shows in block form a control system for controlling the application of image signals to the recording head 3. An image signal representing a desired image is generated by an external image signal generator (not shown). The image signal supplied from the external image signal generator is applied through an interface 10, a three-state buffer 11, and a recording control unit 12 to a recording head driver 13, which then energizes the recording head 3 to form an electrostatic latent image on the sheet 1. After the electrostatically latent image has been formed in the image recording area a1, the three-state buffer 11 is turned off by a control signal supplied from a CPU 14 through an input/output interface 15, and another three-state buffer 17 is turned on by a control signal supplied from the CPU 14 through the input/output interface 15. The CPU 14 also supplies a control signal through the input/output interface 15 to a self-test-pattern generator 16 which then produces a self-test-pattern signal. The self-test-pattern signal is supplied through the three-state buffer 17 and the recording control unit 12 to the recording head driver 13, which energizes the recording head 3 to form an electrostatic latent image corresponding to the self-test-pattern signal on the sheet 1. This electrostatic latent image is actually a solid latent image formed in the image recording area b shown in FIG. 4, to which toner particles in the residual developing solution in the groove 4A are attracted.

The completion of formation of the latent image in the image recording area a1 is indicated by a signal which is supplied from the external image signal generator through the interface 10 and a communication unit 18 to the CPU 14. In response to such a signal, the CPU 14 produces the control signals, referred to above, to switch from the three-state buffer 11 to the three-state buffer 17.

After the image recording area b has moved past the developing unit 4, the rotation of the feed rollers 2b (and the feed rollers 2a) are reversed to feed the sheet 1 back in the direction indicated by the arrow B. At this time, the developing unit 4 is spaced apart from the sheet 1. Heretofore, even if the developing unit 4 is spaced apart from the sheet 1, the residual developing solution in the groove 41 tends to be applied to the sheet 1 due to the surface tension thereof, thereby smearing the image on the sheet 1. According to the present invention, since the toner particles contained in the residual developing solution are attracted to the solid latent image in the image recording area b which immediately follows the latent image in the image recording area a1, the image recording area a1 is not smeared by toner particles.

The above process is repeated until a desired composite color image is formed on the sheet 1, as described above. After the toner particles in the developing solution are attracted to the sheet 1 thus developing the latent images, the developing solution is turned into a colorless transparent solvent, which does not smear the sheet 1 even if applied thereto and does not leave any trace when dried up.

Figure 4:
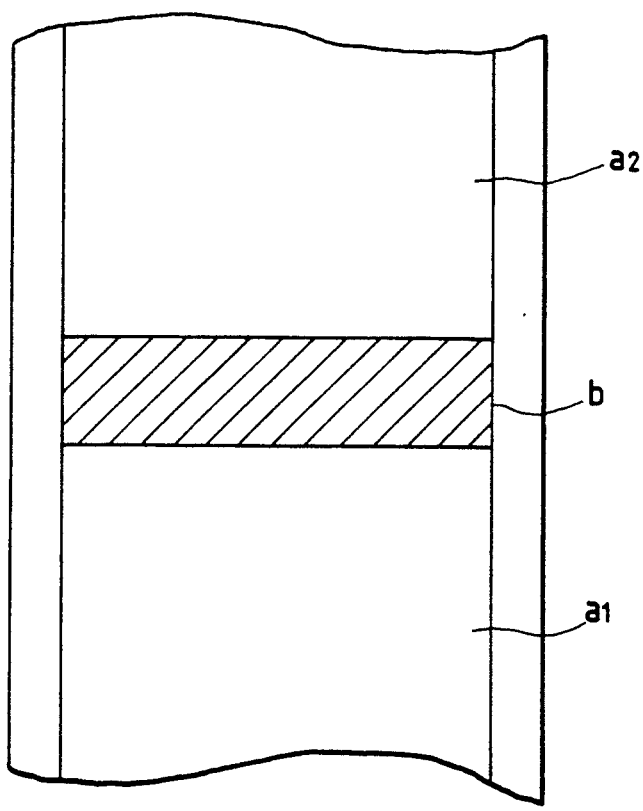
FIG. 4 is a fragmentary plan view showing a sheet of electrostatically recording paper with electrostatic latent images formed in different image recording areas by the color image recording apparatus according to the first embodiment, one of the latent images being used to remove toner particles in residual developing solutions.

As shown in FIG. 4, the image recording area b immediately following the image recording area a1 is of a rectangular shape extending across the sheet 1, and the electrostatically latent image formed therein fully covers the image recording area b. The image recording area b is immediately followed by another image recording area a2, in which electrostatic latent images to be developed in respective component colors will be formed in a next color image recording cycle. After all the electrostatic latent images in the image recording area a1 have been developed into a composite color image, the sheet 1 is fed in the direction indicated by the arrow A to discharge the image recording area a out of the color image recording apparatus, and then the image recording area b with residual toner particles attracted thereto is cut off.

Figure 5:
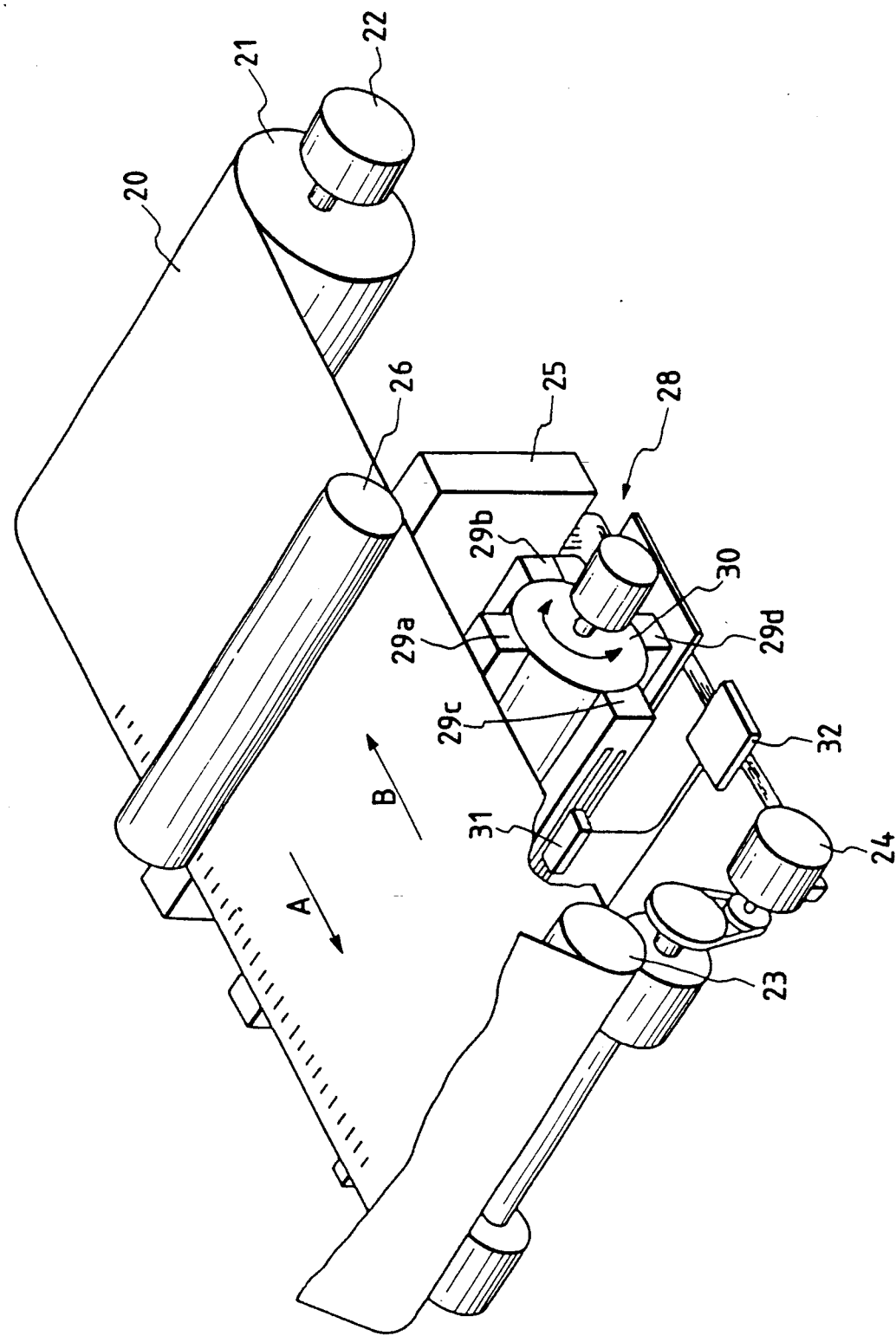
FIG. 5 is a schematic perspective view of a color image recording apparatus according to a second embodiment of the present invention.

FIG. 5 shows a color image recording apparatus according to a second embodiment of the present invention, the color image recording apparatus having a rotary image developing system.

As shown in FIG. 5, the color image recording apparatus includes a supply roll 21 with an elongate sheet 20 of electrostatically recording paper. The supply roll 21 has a shaft coupled to a motor 22 which exerts braking forces to the shaft when the sheet 20 is fed in the direction indicated by the arrow A, and which positively rotates the shaft to feed the sheet 20 back in the direction indicated by the arrow B. The sheet 20 is fed in the direction indicated by the arrow A by a roll 23 rotated by a motor 24. The color image recording apparatus also has pairs of feed rollers (not shown) for feeding the sheet 20.

The color image recording apparatus has an electrostatically recording head 25 disposed beneath the sheet 20 for forming an electrostatic latent image on the sheet 1 in and a pad roller 26 disposed above the sheet 20 for pressing the sheet 1 against the recording head 25.

A rotary image developing system 28 is positioned beneath the sheet 1 for developing electrostatic latent images on the sheet 20 in a developing position with developing solutions containing toner particles of black, cyan, magenta, and yellow. The rotary image developing system 28 comprises four developing units, i.e., a developing unit 29a for developing a latent image with black toner particles, a developing unit 29b for developing a latent image with cyan toner particles, a developing unit 29c for developing a latent image with magenta toner particles, and a developing unit 29d for developing a latent image with yellow toner particles. The developing units 29a, 29b, 29c, 29d are circumferentially angularly spaced on a rotor 30 at equal angular intervals of 45°, for example.

An edge sensor 31, positioned between the rotary image developing system 28 and the roller 23, comprises a line image sensor for detecting an edge of the sheet 20. A controller 32 generates and applies periodic recording timing signals to the recording head 25, control signals to the motors 22, 24 and motors associated with the feed rollers, and control signals to the rotary image developing system 28, based on signals from the edge sensor 31 and a mark detector (not shown) for detecting registration marks.

Figure 6:
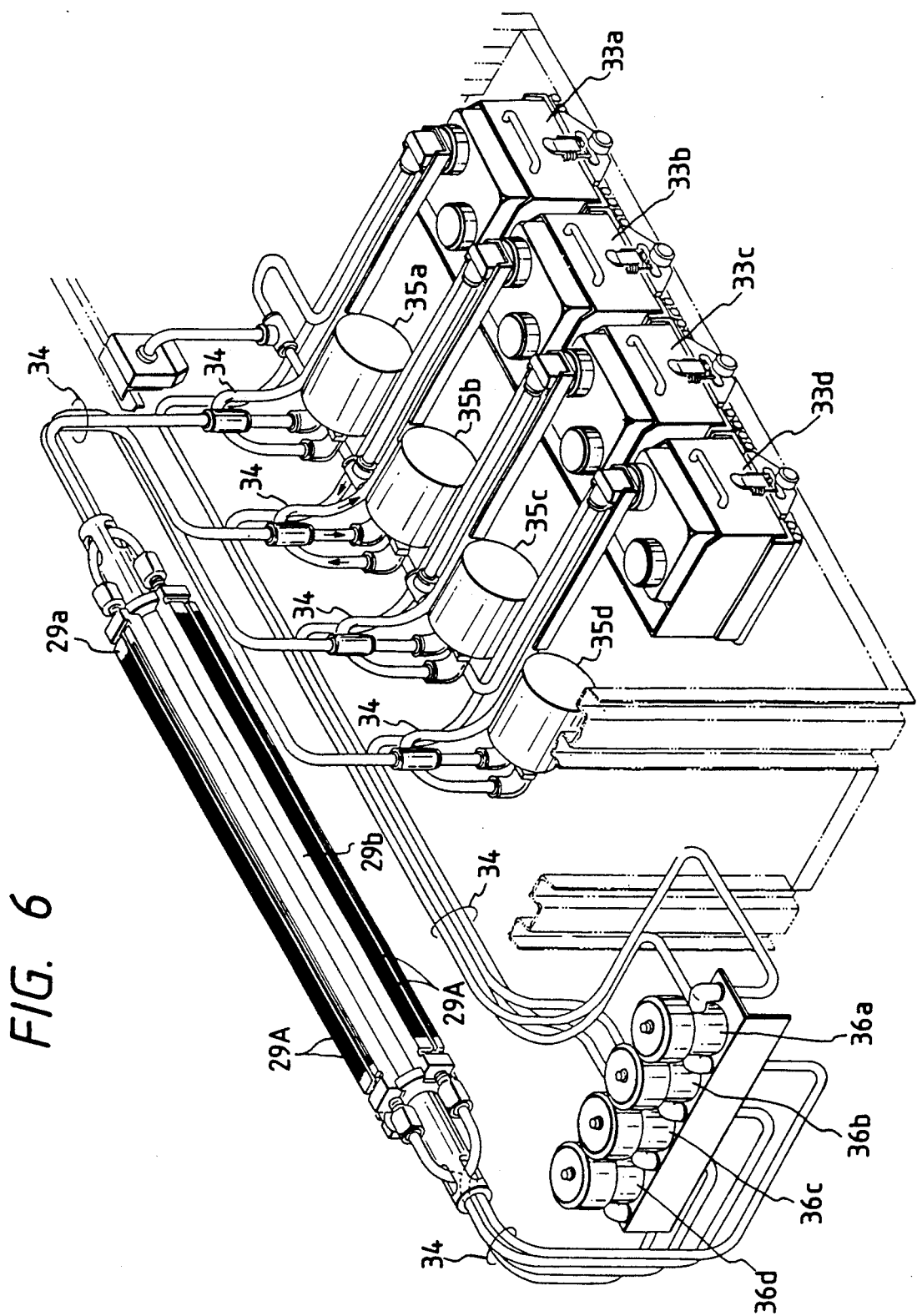
FIG. 6 is a perspective view of a developing solution circulating system associated with a rotary image developing system of the color image recording apparatus according to the second embodiment.

The color image recording apparatus also includes a developing solution circulating system as shown in FIG. 6.

The color image recording apparatus also includes a developing solution circulating system as shown in FIG. 6. In FIG. 6, the developing units 29a, 29b, 29c, 29d are supplied with respective developing solutions from developing solution tanks 33a, 33b, 33c, 33d, respectively, through pipes 34. The developing solutions supplied to open grooves 29A of the developing units 29a, 29b, 29c, 29d are then returned through pipes 34 back to the tanks 33a, 33b, 33c, 33d. The developing solutions are circulated by suction pumps 35a, 35b, 35c, 35d connected to the pipes 34 on the return side. The pipes 34 on the supply side are connected to four solenoid-operated valves 36a, 36b, 36c, 36d, respectively, for controlling the supply of the developing solutions. The solenoid-operated valves 36a–36d, and the vacuum pumps 35a–35d are also controlled in operation by control signals from the controller 32 shown in FIG. 5.

Figure 7:
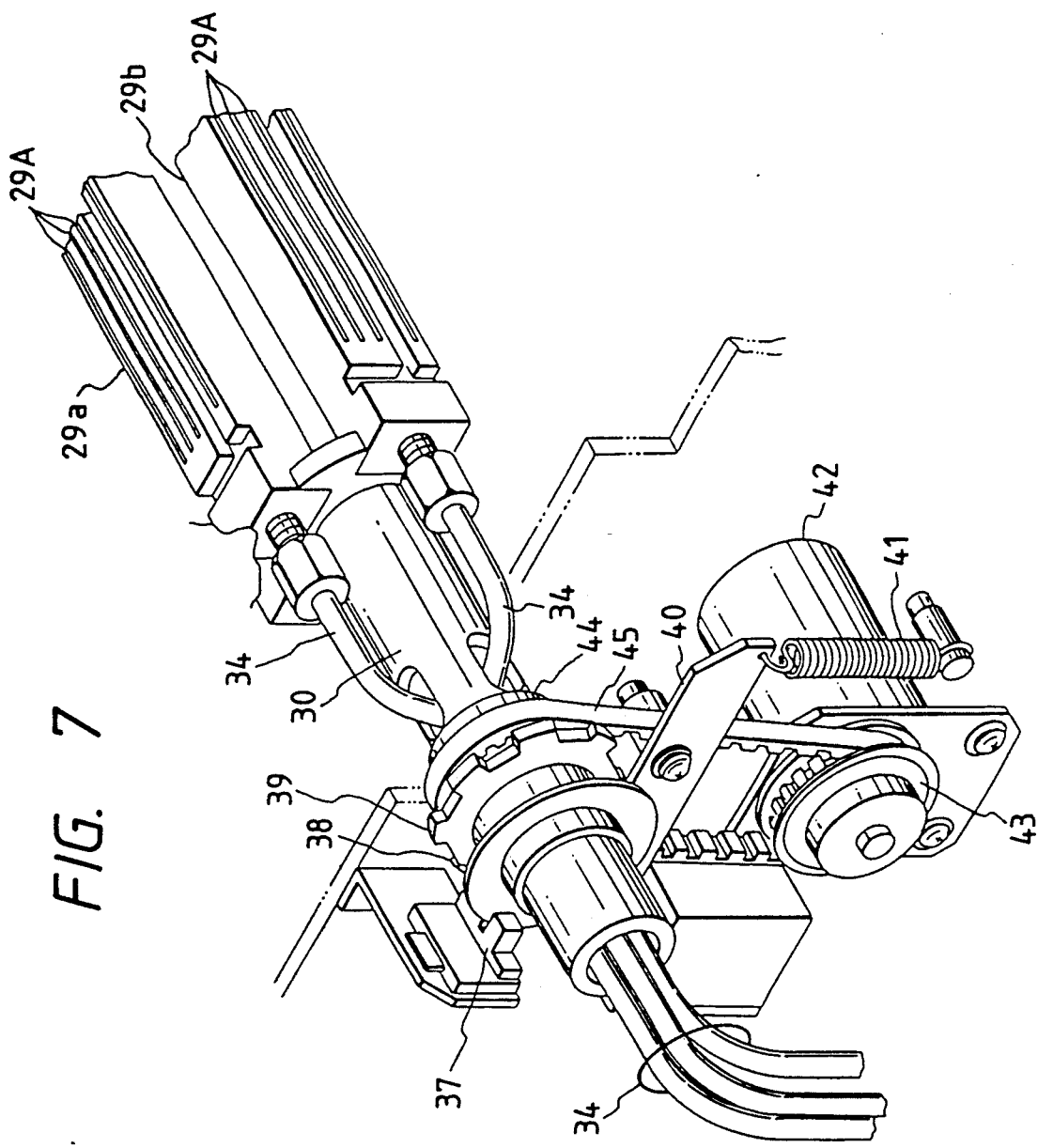
FIG. 7 is an enlarged perspective view of a rotor rotating mechanism for bringing a desired developing unit into a developing position in the rotary image developing system.

FIG. 7 shows a rotor rotating mechanism for rotating the rotor 30 of the rotary image developing system 28 to bring one developing unit into the developing position at a time. The rotor rotating mechanism has an angle sensor 37 for detecting an angular displacement of the rotor 30, an encoded disc 38 coupled to the rotor 30 for giving angular information of the rotor 30 to the angle sensor 37, a cam 39 and a cam lever 40 for mechanically stopping the rotor 30 at a predetermined angle, a spring 41 for urging the cam lever 40, and a motor 42 for rotating the rotor 30 through a pulley 43 fixedly mounted on the shaft of the motor 42, a pulley 44 fixedly mounted on the rotor 30, and an endless belt 45 trained around the pulleys 43, 44.

The color image recording apparatus shown in FIGS. 5 through 7 operates as follows:

Before a color image is recorded on the sheet 20, registration marks 46 (see FIG. 8) are recorded on the sheet 20. More specifically, the motors of the feed rollers and the motors 22, 24 are rotated in one direction to feed the sheet 20 in the direction indicated by the arrow A. When the sheet 20 passes through the recording position at the recording head 25, electrostatically latent images for forming registration marks are successively formed on one edge of the sheet 20 by the recording head 20. Upon passage of the sheet 20 through the developing position, these latent images are developed into black registration marks 46 by contact with the developing solution in the grooves 29A of the developing unit 29a. At this time, the solenoid-operated valve 36a is open and the vacuum pump 35a is actuated by the controller 32, thereby supplying the developing solution to the developing unit 29a.

Figure 8:
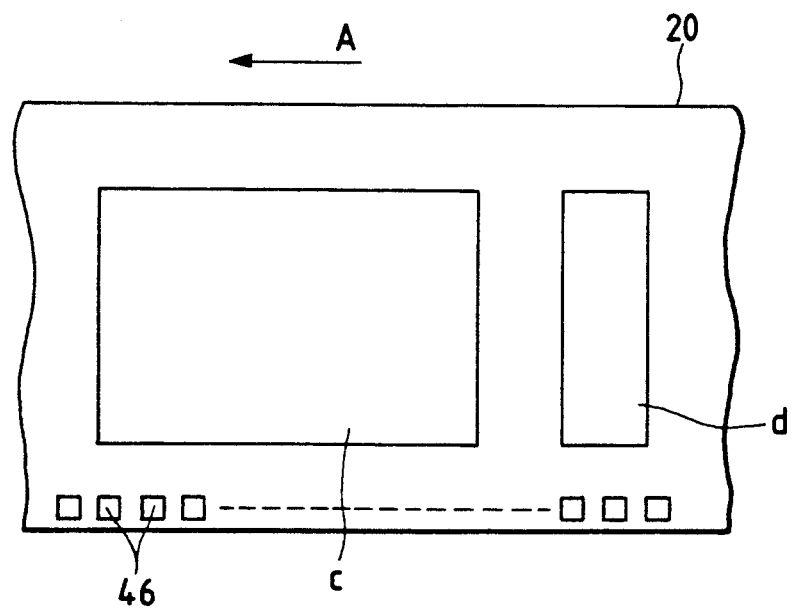
FIG. 8 is a fragmentary plan view showing a sheet of electrostatically recording paper with electrostatic latent images formed in different image recording areas by the color image recording apparatus according to the second embodiment, one of the images being used to remove toner particles in residual developing solutions.

After the registration marks 46 have been recorded as shown in FIG. 8, the sheet 20 is fed back in the direction indicated by the arrow B until the sheet 20 reaches an initial position. Thereafter, a color image starts being recorded on the sheet 20.

First, the sheet 20 is fed in the direction indicated by the arrow A. When the sheet 20 passes through the recording position, an electrostatically latent image corresponding to a black component color image is formed in an image recording area c (FIG. 8) of the sheet 20 by the recording head 25. Thereafter, an electrostatic latent image which is actually a solid latent image is formed in another image recording area d which follows the image recording area c. This process is the same as the process described above with reference to the previous embodiment. The formation of the latent image in image recording area d is controlled by the controller 32 based on the output signal from the edge sensor 31 and the output signal from the non-illustrated mark detector.

The sheet 20 is further fed in the direction indicated by the arrow A. When the sheet 20 moves through the developing position, the latent image in the image recording area c is developing into a black image and then the latent image in the image recording area d is developed into a solid black image, by the developing unit 29a.

At the time the controller 32 detects when the trailing end of the image recording area c moves past the developing position based on the output signal from the mark sensor, the controller 32 closes the solenoid-operated valve 36a to cut off the supply of the developing solution to the developing unit 29a. The vacuum pump 35a is continuously operated to discharge the developing solution from the developing unit 29a.

Thereafter, the image recording area d of the sheet 20 passes through the developing position. By this time, the developing solution has been discharged almost in its entirety from the developing unit 29a. However, a slight amount of developing solution remains undischarged in the grooves 29A of the developing unit 29a. Toner particles contained in the residual developing solution are then attracted to the latent image in the image recording area d as it moves through the developing position. As a result, the toner particles in the residual developing solution are almost entirely removed from the grooves 29A of the developing unit 29a. Simultaneously, most of the solvent of the developing solution is also removed with the toner particles from the grooves 29A.

When the developing unit 29a angularly moves downwardly subsequently, since the toner particles have been removed from the developing unit 29a, the other developing units and surroundings such as the floor are not subjected to smearing spots which would otherwise be produced by leaking developing solutions and toner particles.

Upon passage of the trailing end of the image recording area d of the sheet through the developing position, the controller 32 inactivates the vacuum pump 35a, and reverses the rotation of the motors of the feed rollers and the motors 22, 24 to feed the sheet 20 back in the direction indicated by the arrow B until the sheet reaches the initial position.

While the sheet 20 is being fed back or after it is fed back, the controller 32 energizes the motor 42 to rotate the rotor 30 to bring the developing unit 29b into the developing position (i.e., the uppermost position of the rotary image developing system 28) while monitoring the angular displacement of the rotor 30 based on the output signal from the angle sensor 37.

When the developing unit 29b reaches the developing position as detected by the angle sensor 37, the rotor 30 is stopped by the cam 39 and the cam lever 40 which is actuated by the controller 32. At this time, the rotor 30 has been angularly moved through 45°. The developing unit 29b is held accurately in the developing position by the cam 39 and the cam lever 40.

With the developing unit 29b set in the developing position, the controller 32 opens the solenoid-operated valve 36b and actuates the vacuum pump 35b to supply the developing solution containing cyan toner particles to the developing unit 29b.

The sheet 20 is fed again in the direction indicated by the arrow A by the controller 32. As the sheet 20 moves through the recording position, the recording head 28 forms an electrostatically latent image corresponding to a cyan component color image in superimposed relation to the black image in the image recording area c, and then forms an electrostatic latent image in the image recording area d. These latent images are successively developed into cyan images by the developing solution in the developing unit 29b when passing through the developing position.

When the image recording area c moves past the developing position, the solenoid-operated valve 36b is closed by the controller 32 and the developing solution is discharged from the developing unit 29b by the vacuum pump 35b. When the image recording area d subsequently moves past the developing position, the vacuum pump 35b is inactivated by the controller 32.

In the same manner, magenta and yellow images are recorded in superimposed relation to the black and cyan images which have already been recorded, thereby recording a composite color image in the image recording area c of the sheet 20.

In the above processes of recording cyan, magenta, and yellow images, toner particles in the residual developing solutions in the developing units 29b, 29c, 29d are attracted to the latent images in the image recording area d, and hence do not smear the image recording area c.

After the final yellow component image has been recorded, the motor 35 is energized to rotate the rotor 30 in the reverse direction until the rotary image recording system 28 is angularly moved back to its initial position.

While the developing units 29a-29d have open grooves 29A in the above embodiment, they may be of the type in which they contact the sheet 20 through a sleeve.

Although certain preferred embodiments have been shown and described, it should be understood that many changes and modifications may be made therein without departing from the scope of the appended claims.

We claim as our invention:

1. A color image recording apparatus for recording a composite color image composed of a plurality of superimposed images of different colors on a recording medium, comprising:
   feed means for reciprocally feeding the recording medium in successive strokes;
   latent image forming means for forming first latent images on the recording medium in the respective strokes;
   a plurality of developing means for developing the first latent images formed on the recording medium into respective visible images with respective developers of different colors which are supplied respectively to said developing means, in the respective strokes; and
   control means for controlling said latent image forming means to form second latent images each of a predetermined length on the recording medium after the respective first latent images are formed in the respective strokes by said latent image forming means.

2. A color image recording apparatus for recording a composite color image composed of a plurality of superimposed images of different colors on a recording medium, comprising:
   feed means for reciprocally feeding the recording medium in successive strokes along a path;
   latent image forming means for forming first latent images on the recording medium in the respective strokes;
   a linear array of developing means along said path for developing the first latent images formed on the recording medium into respective visible images with respective developers of different colors which are supplied respectively to said developing means, in the respective strokes; and
   control means for controlling said latent image forming means to form second latent images each of a predetermined length on the recording medium after the respective first latent images are formed in the respective strokes by said latent image forming means.

3. A color image recording apparatus for recording a composite color image composed of a plurality of superimposed images of different colors on a recording medium, comprising:
   feed means for reciprocally feeding the recording medium in successive strokes;
   latent image forming means for forming first latent images on the recording medium in the respective strokes;
   a rotary image developing means comprising a rotor and a plurality of developing units mounted on said rotor for developing the first latent images formed on the recording medium into respective visible images with respective developers of different colors which are supplied respectively to said developing units, in the respective strokes; and
   control means for controlling said latent image forming means to form second latent images each of a predetermined length on the recording medium after the respective first latent images are formed in the respective strokes by said latent image forming means.

4. A color image recording apparatus according to claim 3, wherein said control means comprises means for rotating said rotor in one direction to bring said developing units from initial positions successively into a developing position in which each of said first latent images is developed, and for rotating said rotor in an opposite direction to return said developing units back to said initial positions, respectively, after all of said first latent images are developed.

5. A color image recording apparatus according to claim 3, wherein said developing units are disposed on said rotor substantially at equal angular intervals.

6. A color image recording apparatus for recording a composite color image composed of a plurality of superimposed images of different colors on a recording medium, comprising:

feed means for reciprocally feeding the recording medium in successive strokes;

latent image forming means for forming first latent images on the recording medium in the respective strokes based on image signals;

a plurality of developing means for developing the first latent images formed on the recording medium into respective visible images with respective developers of different colors which are supplied respectively to said developing means, in the respective strokes;

test pattern signal generating means for generating test pattern signals; and control means for applying the test pattern signals from said test pattern signal generating means to said latent image forming means to enable the latent image forming means to form second latent images on the recording medium based on said test pattern signals after the respective first latent images are formed in the respective strokes by said latent image forming means based on said image signals, respectively.

7. A color image recording apparatus for recording a composite color image composed of a plurality of superimposed images of different colors on a recording medium, comprising:

feed means for reciprocally feeding the recording medium in successive strokes;

latent image forming means for forming first electrostatic latent images on the recording medium in the respective strokes;

a rotary image developing means comprising a rotor and a plurality of developing units mounted on said rotor for developing the first latent images formed on the recording medium into respective visible images with respective developing solutions containing toners of different colors, in the respective strokes;

developing solution circulating means for supplying the developing solutions to and discharging the developing solutions from said developing units, respectively;

actuating means for rotating said rotor to bring one, at a time, of said developing units into a developing position in which each of the first electrostatic latent images is developed; and control means for controlling said latent image forming means to form the first electrostatic latent images in a first image recording area of the recording medium, and to form second electrostatic latent images in a second image recording area, other than said first image recording area, of the recording medium, for controlling said developing solution circulating means to discharge the developing solutions from said developing units when the developing units are positioned in the developing position after the first image recording area moves past said developing position, and for controlling said actuating means to rotate said rotor after the second image recording area moves past said developing position.

* * * * *

UNITED STATES PATENT AND TRADEMARK OFFICE
CERTIFICATE OF CORRECTION

PATENT NO. : 5,063,398

DATED : November 5, 1991

INVENTOR(S) : Hiroaki MURAI, Tatsuya KATANO and Shigeki KIKUCHI

It is certified that error appears in the above-identified patent and that said Letters Patent is hereby corrected as shown below:

ON THE TITLE PAGE:

After "[22] Filed: Mar. 6, 1991" insert the priority data as follows:

```
--[30]        Foreign Application Priority Data
     Mar. 6, 1990 [JP]    Japan..........2-55265
     Apr. 25, 1990 [JP]   Japan..........2-109078--
```

Signed and Sealed this

Thirteenth Day of April, 1993

Attest:

STEPHEN G. KUNIN

Attesting Officer    Acting Commissioner of Patents and Trademarks